United States Patent
Washabaugh et al.

(10) Patent No.: US 7,023,856 B1
(45) Date of Patent: Apr. 4, 2006

(54) METHOD AND SYSTEM FOR PROVIDING DIFFERENTIATED SERVICE ON A PER VIRTUAL CIRCUIT BASIS WITHIN A PACKET-BASED SWITCH/ROUTER

(75) Inventors: Douglas Markham Washabaugh, Hubbardston, MA (US); Thomas Anderson, Hudson, NH (US); Kathryn Fuller, North Reading, MA (US)

(73) Assignee: Riverstone Networks, Inc., Santa Clara, CA (US)

( * ) Notice: Subject to any disclaimer, the term of this patent is extended or adjusted under 35 U.S.C. 154(b) by 980 days.

(21) Appl. No.: 10/056,159

(22) Filed: Jan. 24, 2002

Related U.S. Application Data (60) Provisional application No. 60/339,532, filed on Dec. 11, 2001.

(51) Int. Cl.
*H04L 12/56* (2006.01)

(52) U.S. Cl. .................................. 370/395.1; 370/474

(58) Field of Classification Search ............. 370/395.1, 370/396–397, 399, 409, 395.21, 395.4, 395.41, 370/395.42, 395.43, 395.52, 411, 412, 413, 370/476, 474, 428, 389
See application file for complete search history.

(56) References Cited

U.S. PATENT DOCUMENTS

| | | | |
|---|---|---|---|
| 5,499,238 A | 3/1996 | Shon | |
| 5,629,928 A | 5/1997 | Calvignac et al. | |
| 5,742,765 A | 4/1998 | Wong et al. | |
| 5,859,835 A * | 1/1999 | Varma et al. | 370/229 |
| 5,941,952 A * | 8/1999 | Thomas et al. | 709/234 |
| 6,226,267 B1 | 5/2001 | Spinney et al. | |
| 6,259,699 B1 | 7/2001 | Opalka et al. | |
| 6,286,049 B1 | 9/2001 | Rajakarunanayake et al. | |
| 6,320,845 B1 | 11/2001 | Davie | |
| 6,944,170 B1* | 9/2005 | Minkenberg | 370/411 |
| 2001/0033581 A1* | 10/2001 | Kawarai et al. | 370/468 |
| 2002/0118644 A1* | 8/2002 | Moir | 370/230.1 |

FOREIGN PATENT DOCUMENTS

WO   WO 02/14979 A2   2/2002

* cited by examiner

*Primary Examiner*—Brenda Pham
(74) *Attorney, Agent, or Firm*—Mark A. Wilson (57) ABSTRACT

Different levels of service are provided to different types of traffic within a single virtual circuit (VC) by converting the traffic from fixed-length cells to variable-length packets, classifying the packets based on information in the packet headers, associating the packets with a VC, and then implementing class-specific enqueuing and dequeuing of the classified packets on a per-VC basis. Classified packets are dequeued from VC-specific and class-specific queues into VC-specific segmentation and re-assembly (SAR) queues according to an algorithm that is a function of traffic class. The dequeuing algorithm determines the level of service that is provided to the different classes of traffic within each VC. Packets are dequeued from the VC-specific SAR queues and converted back to fixed-length cells according to an algorithm that arbitrates among multiple VC-specific SAR queues. The technique for managing traffic can be carried out within an Ethernet switch/router that includes input and output ATM interfaces.

54 Claims, 9 Drawing Sheets

METHOD AND SYSTEM FOR PROVIDING DIFFERENTIATED SERVICE ON A PER VIRTUAL CIRCUIT BASIS WITHIN A PACKET-BASED SWITCH/ROUTER

CROSS-REFERENCE TO RELATED APPLICATION

This application is entitled to the benefit of provisional Patent Application Ser. No. 60/339,532, filed 11 Dec. 2001.

FIELD OF THE INVENTION

The invention relates to communications networks, and more particularly to managing traffic from multiple virtual circuits in a packet-based switch/router.

BACKGROUND OF THE INVENTION

Figure 1:
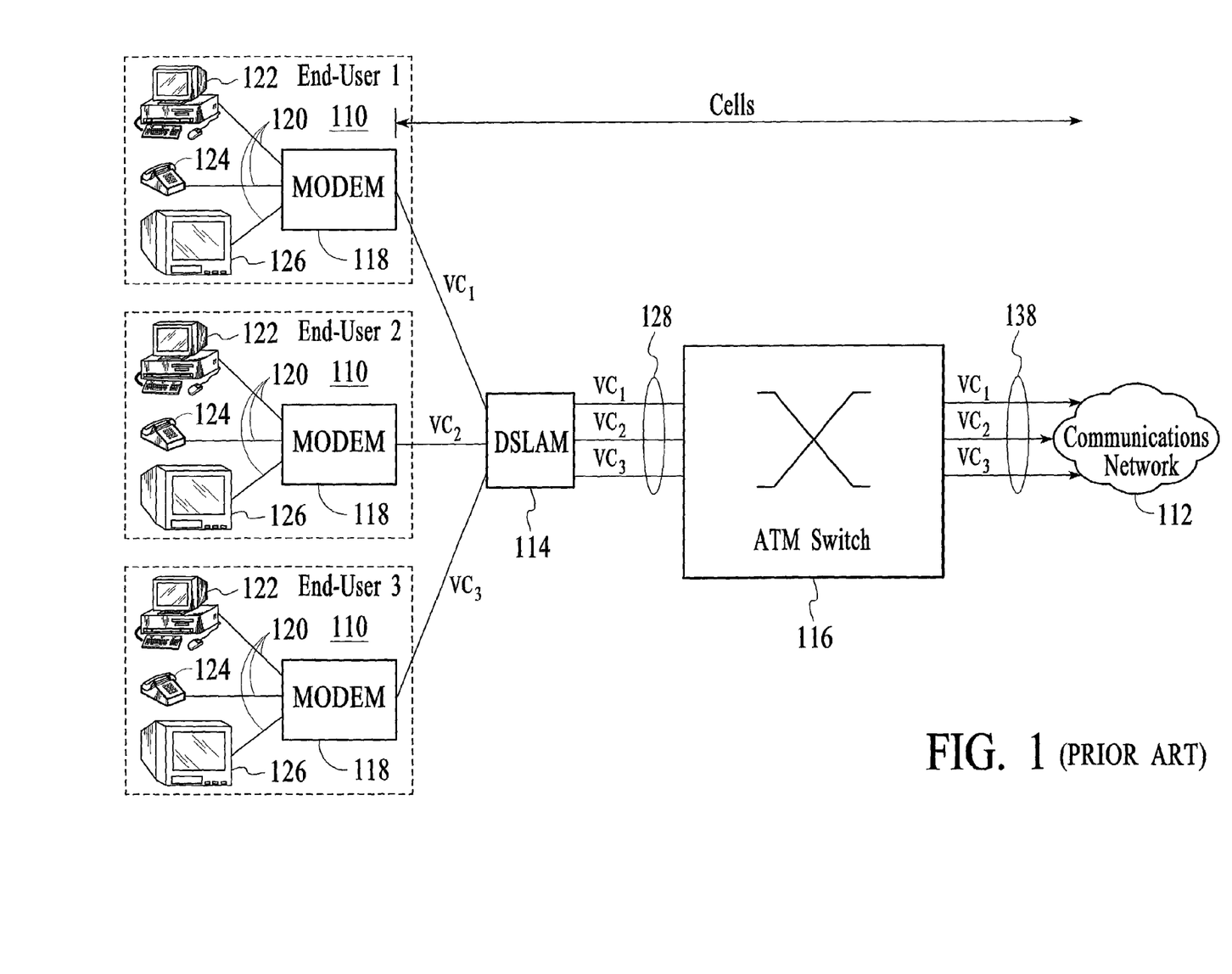
FIG. 1 depicts an example DSL deployment that includes multiple end users connected to a broader communications network via a DSLAM and an ATM switch in accordance with the prior art.

High speed network connections to residences and small businesses can be used to support different types of traffic, such as voice, video, and data traffic. One technology that has been deployed to provide high speed network connections to residences and small businesses is digital subscriber line (DSL). FIG. 1 depicts an example of a DSL deployment that includes multiple end users 110 connected to a broader communications network 112 via a DSL access multiplexer (DSLAM) 114 and an asynchronous transfer mode (ATM) switch 116. In a DSL network, the end users typically have a modem 118 that is connected, via Ethernet connections 120, to end user communications devices 122, 124, and 126 such as computers, telephones, televisions, etc. For communications from an end user to the communications network, the DSL modem takes Ethernet frames from the end user communications devices and transmits the Ethernet frames to the DSLAM using a pre-established user-specific ATM virtual circuit (VC). FIG. 1 depicts three user-specific VCs ($VC_1$, $VC_2$, and $VC_3$) that are specific to end users 1, 2, and 3 respectively. The DSLAM aggregates traffic from the end users and transmits the traffic, within the user-specific VCs, to the ATM switch via an ATM link 128. The ATM switch forwards the traffic to a broader communications network via ATM link 138. The process is basically reversed for traffic that travels from the communications network to the end users.

Figure 2:
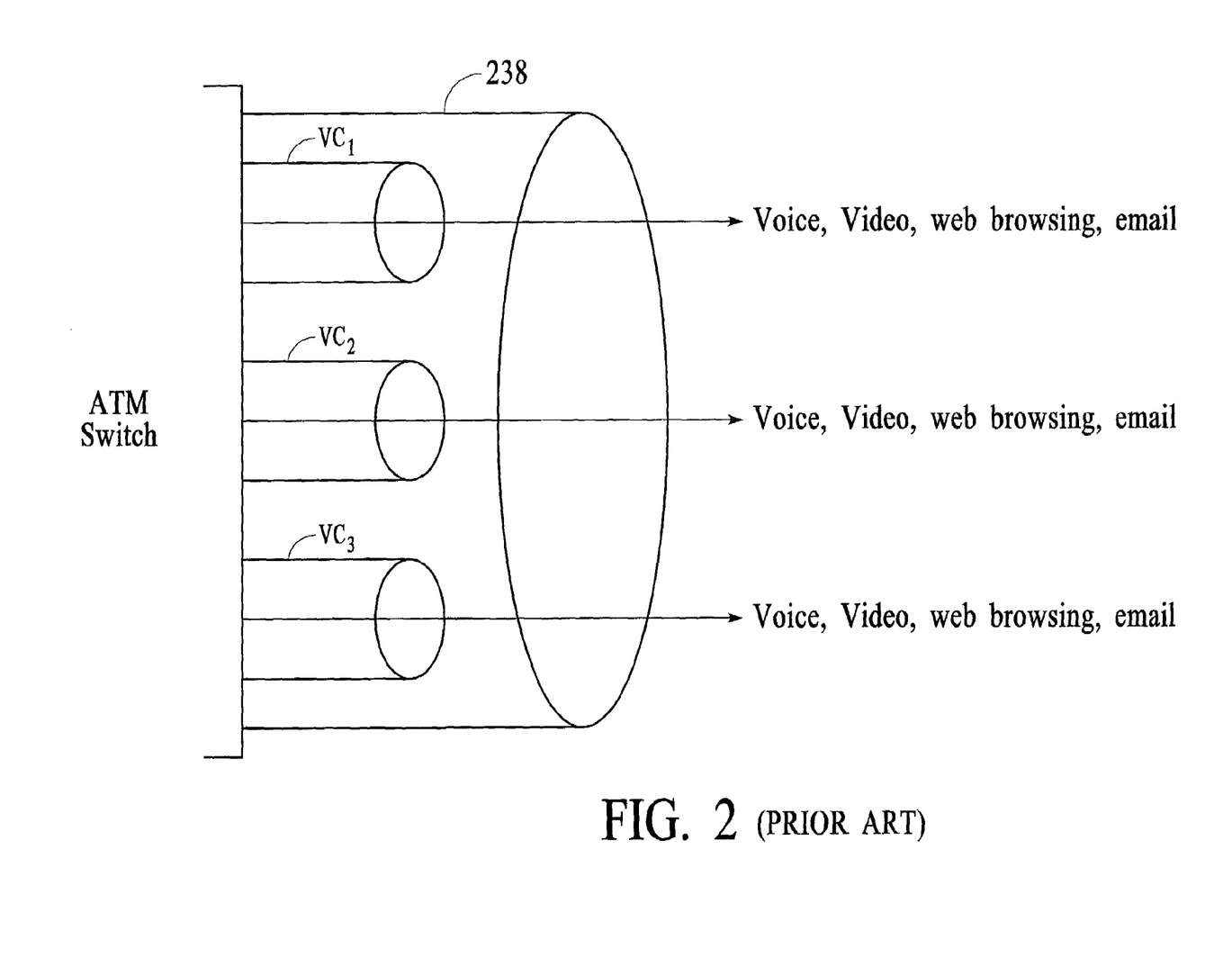
FIG. 2 is a logical depiction of the three VCs from FIG. 1, where each VC carries a combination of voice, video, and data traffic that cannot be easily distinguished in accordance with the prior art.

Current DSL networks are effective for communicating a single type of traffic (i.e., data traffic from web browsing and email) between an end user and a broader communications network. However, DSL networks are not as effective at handling end user traffic that includes different types of media with different quality of service needs. For example, current DSL networks are not as effective at handling traffic that includes a combination of voice, video, and data traffic. As described above and as depicted in FIG. 1, typically a single VC is used to communicate all of the traffic related to a single end user. FIG. 2 is a logical depiction of the three VCs from FIG. 1, where each VC carries a combination of voice, video, and data traffic on ATM link 238. When a single VC is used in an ATM network to communicate different types of traffic for an end user, it is difficult to distinguish between the different types of traffic that are being carried within the VC. Because the different types of traffic within each VC are not easily distinguishable, it is difficult to provide each different traffic type with a level of service that is specific to the needs of the traffic type. As a result, all of the traffic within a VC gets treated the same regardless of its specific needs. Treating all types of traffic within a VC the same can produce poor results, especially for delay sensitive traffic such as voice traffic.

One technique that can be used to provide different levels of service to the different types of traffic in the DSL network of FIG. 1 involves dedicating a unique VC to each different type of traffic that is generated from each end user and then applying different levels of service to each VC. For example, an end user is assigned a first VC for voice traffic, a second VC for video traffic, and a third VC for data traffic, with each VC receiving the appropriate level of service. Although dedicating multiple traffic-specific VCs to each end user enables different levels of service to be provided to different traffic types, it also restricts the scaleability of the DSL network because the number of uniquely identifiable VCs in an ATM network is limited. The number of uniquely identifiable VCs available in a DSL network may be increased by adding additional network hardware, however, this increases the capital cost of the network and ultimately increases the subscription cost to the end users.

In view of the desire for high speed network connections that can be scaled to support multiple end users, what is needed is a method and system that can be deployed within a network that supports different levels of service for different types of traffic without requiring unique VCs for each different type of traffic.

SUMMARY OF THE INVENTION

Different levels of service are provided to different types of traffic within a single VC by converting the traffic from fixed-length cells to variable-length packets, classifying the packets based on information in the packet headers, associating the packets with a VC, and then implementing class-specific enqueuing and dequeuing of the classified packets on a per-VC basis. In an embodiment, the classified packets are dequeued from VC-specific and class-specific queues into VC-specific segmentation and re-assembly (SAR) queues according to an algorithm that is a function of traffic class. The algorithm that is used to dequeue the packets determines the level of service that is provided to the different classes of traffic within each VC. Packets are dequeued from the VC-specific SAR queues and converted back to fixed-length cells according to an algorithm that arbitrates among multiple VC-specific SAR queues.

The type of traffic carried within the variable-length packets can be classified into different traffic classes because the packet headers identify characteristics of the traffic that cannot be identified from the headers of the respective fixed-length ATM cells. For example, the packet headers can identify whether the packets are carrying voice, video, or data traffic. Example algorithms that can be used to dequeue packets from the VC-specific and class-specific queues include weighted fair dequeuing, strict priority dequeuing, and weighted fair with strict priority dequeuing. In a DSL network application, voice, video, and data traffic can be separated into different classes and managed such that priority is given to the delay sensitive voice traffic while the video and data traffic share the remaining transmission capacity according to given percentages. Because different levels of service can be provided to different types of traffic within a single VC, a network, such as a DSL network, can provide high quality network connections with one dedicated VC per end user.

Other aspects and advantages of the present invention will become apparent from the following detailed description, taken in conjunction with the accompanying drawings, illustrating by way of example the principles of the invention.

DETAILED DESCRIPTION

Figure 3:
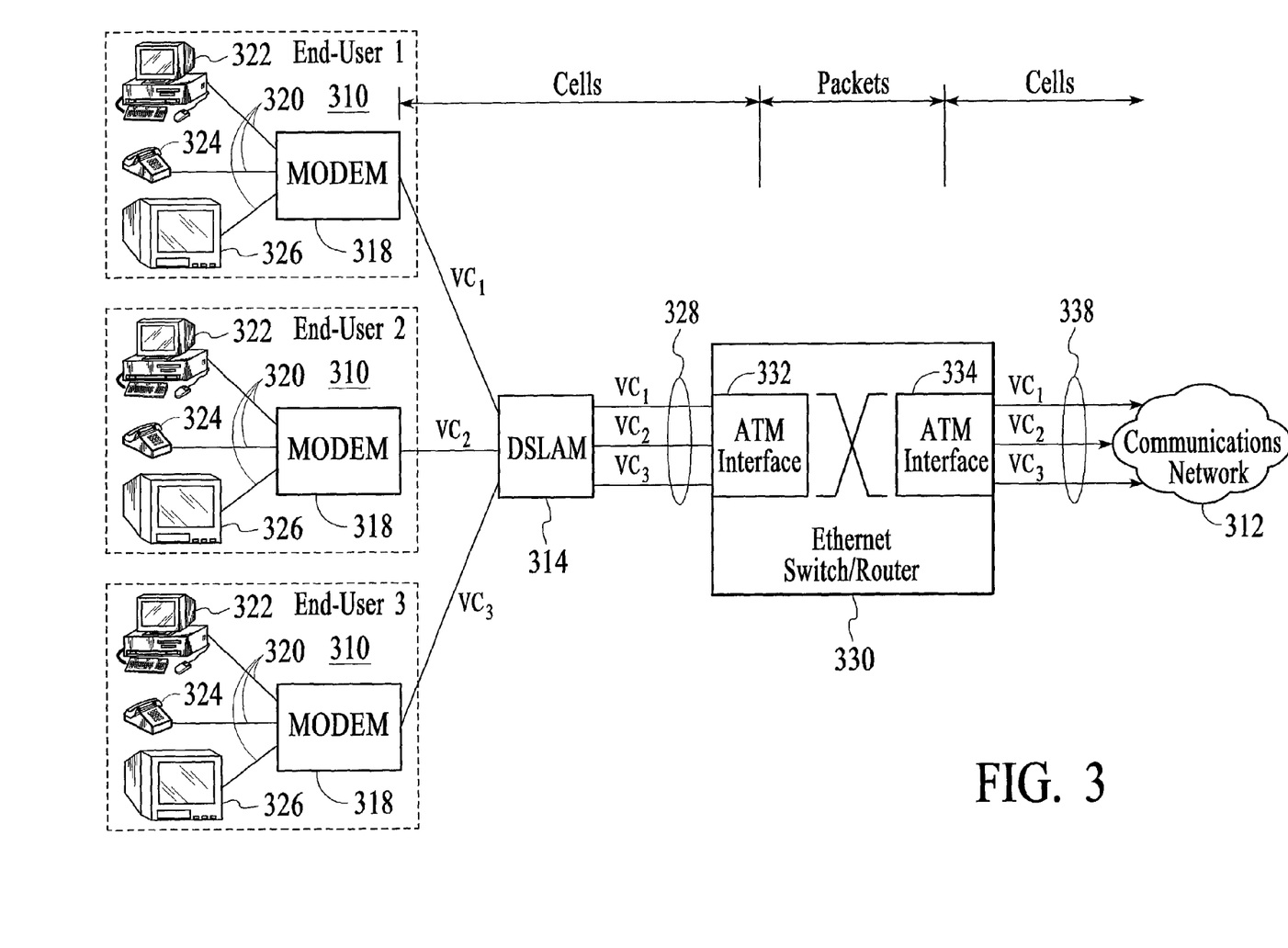
FIG. 3 depicts an example of a DSL network that includes multiple end users connected to a broader communications network via a DSLAM and an Ethernet switch/router in accordance with an embodiment of the invention.

In accordance with an embodiment of the invention, information within the headers of variable-length packets is used by a packet-based switch/router to identify different classes of traffic within a VC so that different levels of service can be provided to the different classes of traffic on a per-VC basis. In an embodiment, an Ethernet switch/router is deployed within a DSL network to provide different levels of service to different types of traffic within an ATM-based VC. FIG. 3 depicts an example of a DSL network that includes multiple end users 310 connected to a broader communications network 312 via a DSLAM 314 and an Ethernet switch/router 330.

Referring to the DSL network of FIG. 3, each end user 310 has a DSL modem 318 that is connected to end user communications devices 322, 324, and 326 such as computers, telephones, televisions, etc. In an embodiment, the end user communications devices are equipped to communicate via packet based protocols such as the Internet protocol (IP). Some communications devices may utilize the Ethernet protocol to communicate with the respective DSL modem while other devices may utilize other protocols to communicate with the DSL modem. For communications from an end user to the communications network 312, a DSL modem receives traffic from the end user communications devices segments the packets into fixed-length ATM cells, and transmits the fixed-length ATM cells within pre-established user-specific ATM VCs to the DSLAM 314. Although in the embodiment of FIG. 3, ATM is used to transmit traffic between the DSL modems and the DSLAM, other protocols, including variable-length packet protocols, may be used to transmit traffic across this segment. Throughout the description, the term "packet" refers to traffic that is formatted according to variable-length packet protocols, such as Ethernet and IP, and the term "cell" refers to traffic that is formatted according to fixed-length protocols, such as ATM.

The DSLAM 314 aggregates the traffic from the end users 310 and forwards the traffic to the Ethernet switch/router 330 within the same user-specific ATM VCs that are used between the DSL modems 318 and the DSLAM. For example, FIG. 3 depicts three user-specific VCs ($VC_1$, $VC_2$, and $VC_3$) that are established to forward traffic related to end users 1, 2, and 3, respectively. The DSLAM transmits traffic to the Ethernet switch/router over an ATM link 328 that exists between the Ethernet switch/router and the DSLAM. In the embodiment of FIG. 3, all three of the user-specific VCs are carried within the same physical link although this is not required.

The Ethernet switch/router 330 includes ATM interfaces 332 and 334 that re-assemble incoming fixed-length cells into the original variable-length packets and segment outgoing variable-length packets into fixed-length cells. After fixed-length cells have been re-assembled into variable-length packets, the Ethernet switch/router makes forwarding decisions based upon information that is read from the headers of the respective variable-length packets. For example, the switch/router may make forwarding decisions based on layer 2 header information (i.e., MAC addresses), layer 3 header information (i.e., IP addresses), and/or higher layer information (i.e., layer 4 protocols such as TCP or UDP), where the layers of header information are defined by the International Standards Organization (ISO) in the Open System Interconnection (OSI) Model). In the embodiment of FIG. 3, ATM traffic entering the Ethernet switch/router at an input ATM interface is converted from fixed-length ATM cells to variable-length packets and the variable-length packets are forwarded to the appropriate output port of the switch/router. At the appropriate output port, variable-length packets are converted back to fixed-length ATM cells and then transmitted from an output ATM interface of the Ethernet switch/router to the communications network 312 on an output ATM link 338. In the embodiment of FIG. 3, ATM traffic enters and leaves the Ethernet switch/router on the same user-specific VC. For example, traffic that enters the Ethernet switch/router on $VC_1$ also leaves the Ethernet switch/router on $VC_1$. The process of communicating traffic in the opposite direction, from the communications network to the end users, is essentially the reverse of the above-described process.

Figure 4:
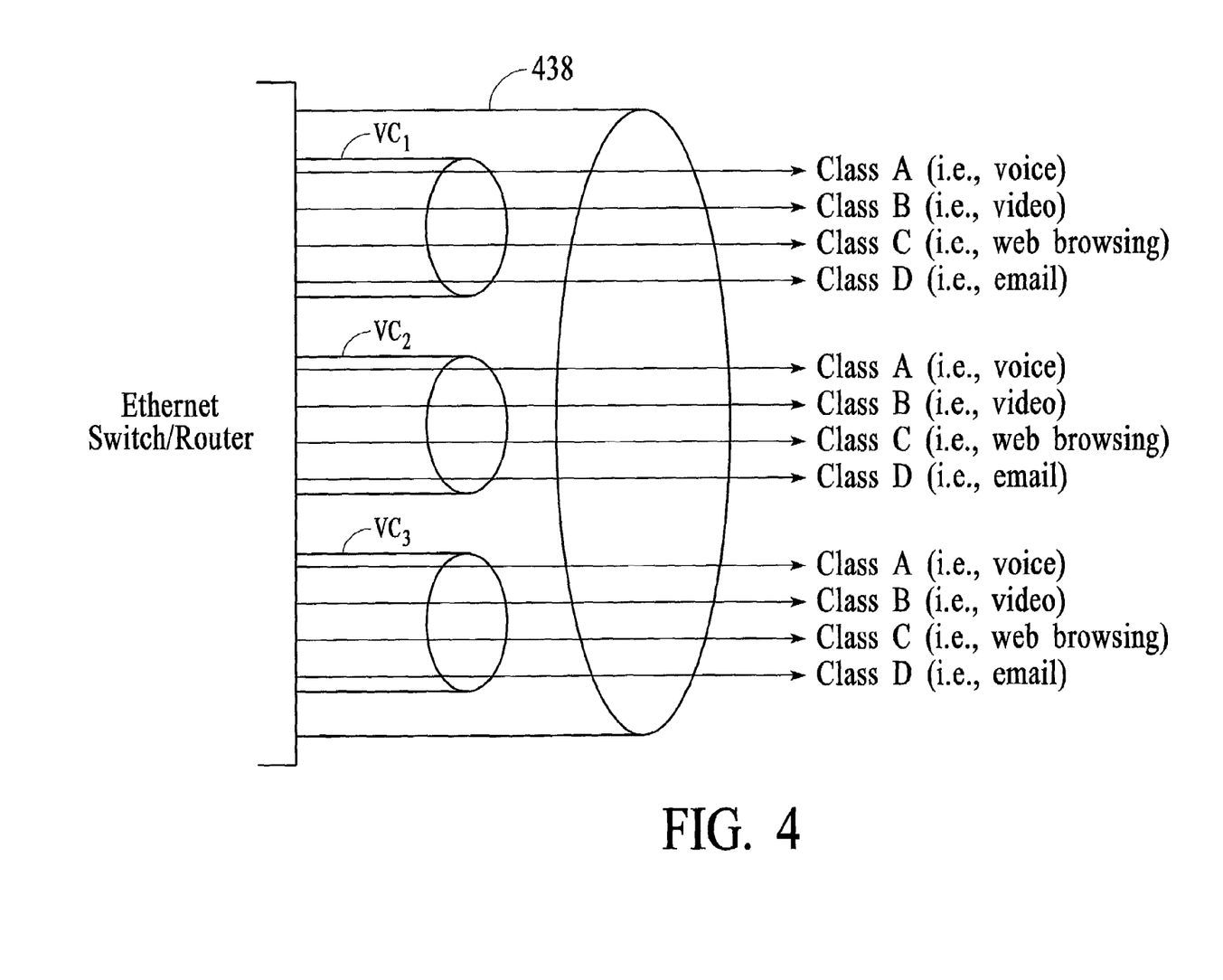
FIG. 4 is a logical depiction of different classes of traffic that have been identified, in accordance with an embodiment of the invention, within each of the three VCs from FIG. 3.

As stated above, information within the headers of variable-length packets is used by the Ethernet switch/router 330 to identify different classes of traffic within a VC so that different levels of service can be provided to the different classes of traffic on a per-VC basis. FIG. 4 is a logical depiction of different classes of traffic that have been identified within each of the three VCs from FIG. 3. For example, each VC includes four classes of traffic (classes A, B, C, and D) with each class of traffic including a specific type of traffic (i.e., voice, video, web browsing, and email). The different classes of traffic within each VC can be provided different levels of service on a per-VC basis, thereby enabling more control over the quality of service on the output ATM link 438 than a system that treats all of the different types of traffic within a VC the same. Different classes of traffic are able to be identified on a per-VC basis by re-assembling incoming fixed-length cells into variable-length packets within the switch/router and reading the variable-length packet headers. Different levels of service are provided to the different classes of traffic by implementing class-specific enqueuing and dequeuing algorithms as is described below. Different levels of service can be provided to the different classes of traffic whether the traffic is traveling from the end users 310 to the communications network 312 or from the communications network to the end users.

Figure 5:
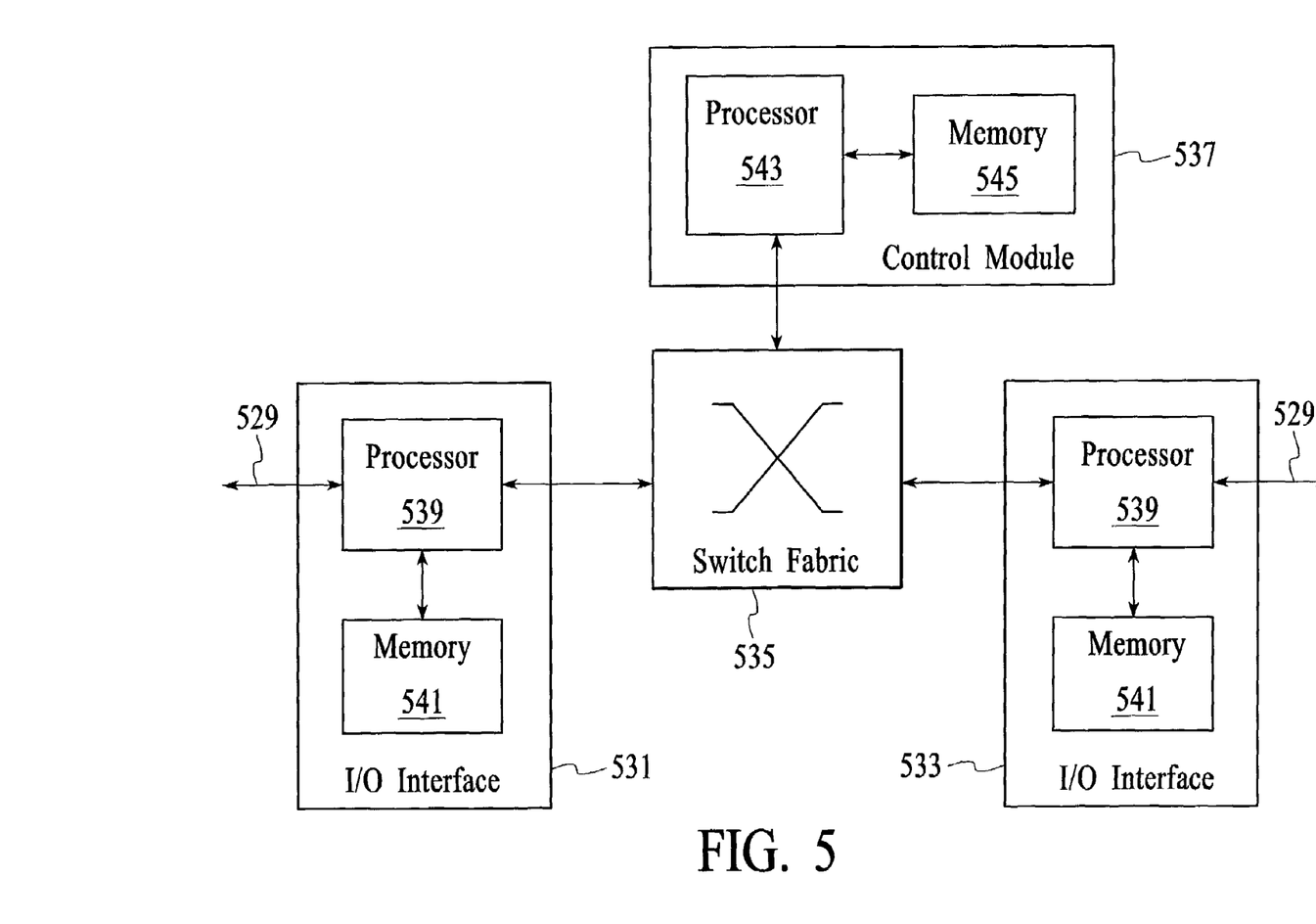
FIG. 5 is a general depiction of the components of the switch/router shown in FIG. 3.

For example purposes, the basic functional components of the Ethernet switch/router depicted in FIG. 3 are depicted in FIG. 5. The components include input/output (I/O) interfaces 531 and 533, a switch fabric 535, and a control module 537. The components are described briefly herein and are well known in the field of packet-based switching and routing. Each I/O interface includes links 529, a processor 539, and memory 541, which perform functions such as receiving traffic into the switch/router, buffering traffic, making forwarding decisions, and transmitting traffic from the switch/router. The processor 539 may include a multi-function microprocessor and/or an application specific processor that is operationally connected to the memory 541. The memory may include circuits for storing operational code and buffering traffic. Operational code is typically stored in non-volatile memory such as electrically erasable programmable read-only memory (EEPROM) or flash ROM while traffic and other data structures are typically stored in volatile memory such as dynamic random access memory (DRAM). The switch fabric 535 creates datapaths between input and output interfaces and may include, for example, shared memory, shared bus, and crosspoint matrices. The control module 537 supports various processes such as support functions, network management functions, and protocol implementation functions. The control module includes a processor 543 and memory 545. The processor 543 may include a multifunction microprocessor and/or an application specific processor that is operationally connected to the memory 545. The memory may include circuits for storing operational code and buffering traffic. Operational code is typically stored in non-volatile memory such as EEPROM or flash ROM while traffic and other data structures are typically stored in volatile memory such as DRAM.

Figure 6:
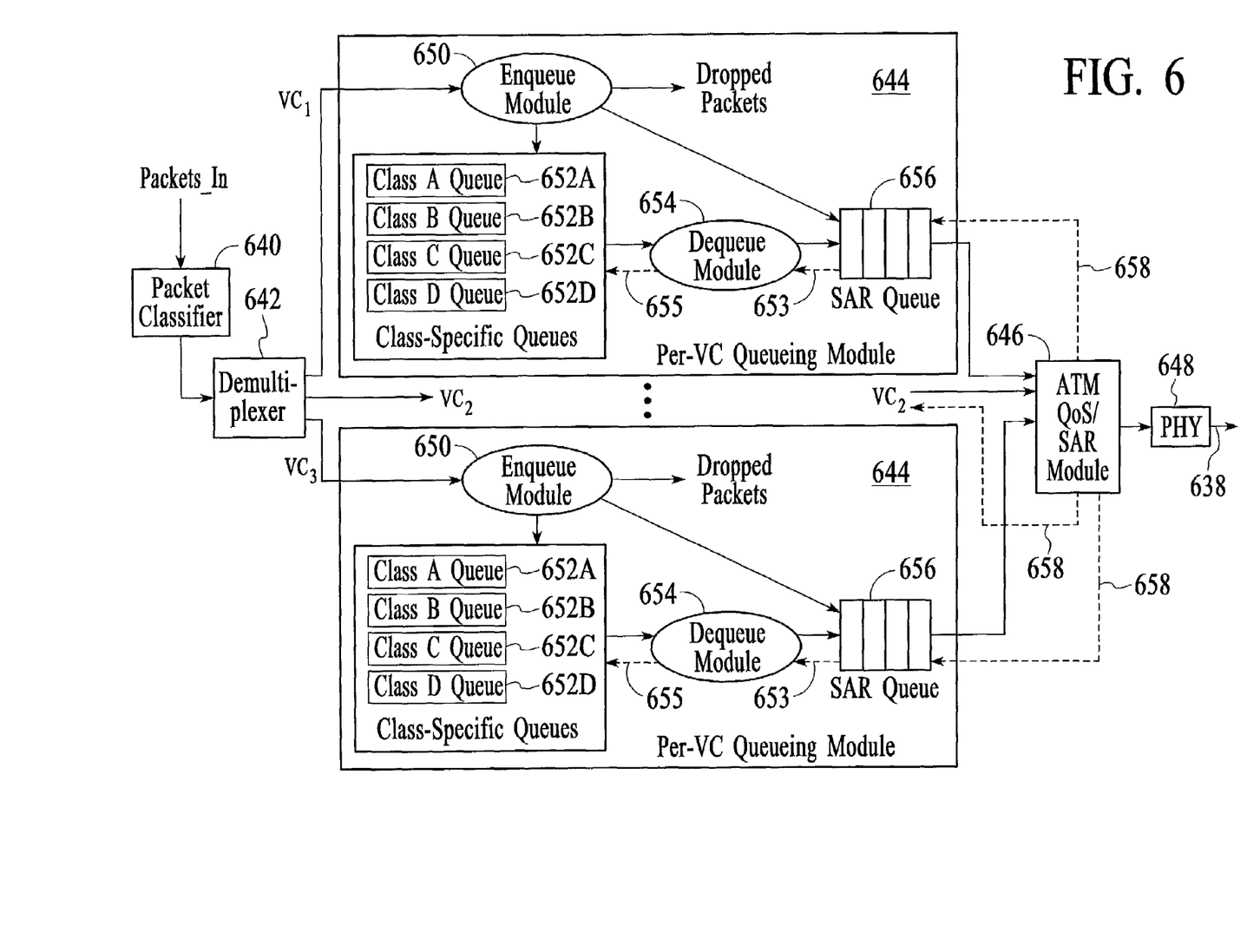
FIG. 6 depicts an embodiment of the logic carried out within the Ethernet switch/router of FIG. 3 to identify different classes of traffic and provide different levels of service to the different classes of traffic in accordance with an embodiment of the invention.

An embodiment of the logic carried out within the Ethernet switch/router 330 to identify different classes of traffic and provide different levels of service to the different classes of traffic is described with reference to FIG. 6. The functional units within the logical depiction of FIG. 6 include a packet classifier 640, a demultiplexer 642, a per-VC queuing module 644 for each VC, an ATM QoS/segmentation and re-assembly (SAR) module 646, and a physical layer module (PHY) 648. In the embodiment of FIG. 6, the demultiplexer, the per-VC queuing modules, the ATM QoS/SAR module, and the PHY are included within an output interface of the Ethernet switch/router, for example, ATM interface 334 of the Ethernet switch/router 330 of FIG. 3 and the packet classifier is included within an input interface of the Ethernet switch/router, for example, ATM interface 332. In alternative embodiments, the functional units may reside in different locations within the switch/router. Throughout the description, similar reference numbers may be used to identify similar elements.

The packet classifier 640 reads header information from variable-length packets to determine the traffic class to which the variable-length packets belong. In an embodiment, the packet classifier can read information from any of the layer 2 through layer 7 headers (as defined in the OSI model) of a variable-length packet to classify the packet. The number and types of traffic classes that are established is implementation specific. In the embodiment of FIG. 6, four different packet classes, identified as class A, class B, class C, and class D, are established. In an embodiment, the four different traffic classes are established for traffic types that have distinct transmission requirements (i.e., bandwidth, latency, latency variation, traffic loss, etc.) In an embodiment, the packet classifier may read header information from the layer 2, layer 3, and layer 4 headers of a variable-length packet to classify the packet into one of the traffic classes. Fields of interest to the packet classifier may include input and output port information, media access control (MAC) source and destination addresses, IP source and destination addresses, layer 4 protocol types (i.e., TCP or UDP), and socket numbers etc. As is described below, the traffic classes (or any subset of classes) may be prioritized relative to each other.

The demultiplexer 642 associates variable-length packets with a VC, for example, the ATM VC on which the packets arrived (the variable-length packets arrive on an ATM interface within fixed-length cells and the variable-length packets are re-assembled from the received fixed-length cells). That is, packets which were re-assembled from ATM cells that arrived on $VC_1$ at an input ATM interface (i.e., ATM interface 332 from FIG. 3) are associated with $VC_1$ at the output ATM interface (i.e., ATM interface 334 from FIG. 3). In an embodiment, the demultiplexer determines which VC a variable-length packet arrived on by using a look-up table. For example, demultiplexing may involve a source MAC address-to-VC look-up. In an embodiment, traffic arriving on one VC may be switched to a different VC at the output ATM interface. In this case, the demultiplexer associates the incoming packets with the different ATM VC. Although in the embodiment of FIG. 6, the packet classifier 640 is located functionally before the demultiplexer, in another embodiment, the variable-length packets are demultiplexed before they are classified. The particular order and manner by which variable-length packets are classified and demultiplexed is not critical.

Once the VC associated with a variable-length packet is identified by the demultiplexer 642, the packet is queued by a per-VC queuing module 644 that is specific to the identified VC. Each per-VC queuing module includes an enqueue module 650, class-specific queues (also referred to as VC-specific and class-specific queues) 652A, 652B, 652C, and 652D, a dequeue module 654, and a SAR queue (also referred to as a VC-specific SAR queue) 656. In the embodiment of FIG. 6, there are class-specific queues 652A, 652B, 652C, and 652D that correspond to the traffic classes identified by the packet classifier 640. In an embodiment, the class-specific queues are formed by a linked list of pointers, where the pointers identify the location of the respective packets in memory. The memory (also referred to as buffer space) is limited and in the embodiment of FIG. 6, each class of traffic is allocated a limited amount of buffer space. The amount of buffer space that is allocated to each class of traffic limits the number of packets that can be buffered and queued in each VC-specific and class-specific queue. Throughout the description, the terms enqueuing, queuing, dequeuing and any variations of the terms include placing/removing packets into/from buffers and adding/deleting packets to/from linked lists. The size of each class-specific buffer can be adjusted as needed to achieve a desired performance characteristic. In an embodiment, multiple pointers may be used to identify a single packet when different parts of the packet are stored in different buffers.

Referring to the per-VC queuing 644 module related to $VC_i$ for description purposes, the enqueue module makes the initial queuing decision for each incoming variable-length packet. In an embodiment, the enqueue module has three options for handling each variable-length packet. Specifically, an incoming packet can be placed directly into the SAR queue, queued into one of the class-specific queues, or dropped. In an embodiment, the enqueue module carries out the following logic. The enqueue module first attempts to place the variable-length packet directly into the SAR queue. A packet can be placed directly into the SAR queue only if there is room in the SAR queue and if all of the class-specific queues are empty. If there is no room in the SAR queue or there is a packet in one of the class-specific queues, then the enqueue module attempts to place the variable-length packet into the appropriate class-specific queue, that is, the class-specific queue that matches the class of the packet. If the appropriate class-specific queue has space available, then the variable-length packet is placed into the appropriate class-specific queue and the status of the queue is updated to reflect the new packet. However, if the appropriate class-specific queue is full, then the variable-length packet is dropped. When all packets can be placed directly into a VC-specific SAR queue, then all classes of traffic within the VC are treated the same. In an embodiment, packets are queued on a first-in first-out basis. In an embodiment, the logic of the enqueue module is carried out by an application specific integrated circuit (ASIC) and in another embodiment, the logic of the enqueue module is carried out by a multifunction processor.

A packet is removed from one of the class-specific queues 652A–652D (dequeued) and placed into the SAR queue 656 whenever there is room in the SAR queue for another packet. In an embodiment, a queue_space_available signal 653 is received by the dequeue module whenever there is room for another packet in the SAR queue. In response to the queue_space_available signal, the dequeue module 654 implements a dequeuing algorithm that determines how packets are dispatched from the class-specific queues and placed into the SAR queue. In the embodiment of FIG. 6, a dispatch_control signal 655 is used to initiate the dispatching of packets from the class-specific queues. Many different algorithms can be implemented by the dequeue module to dequeue packets from the class-specific queues. Three example dequeuing algorithms that can be implemented are weighted fair dequeuing, strict priority dequeuing, and weighted fair with strict priority dequeuing. The dequeuing algorithms are described in general followed by a more detailed description of some of the algorithms. In an embodiment, the logic of the dequeue module is carried out by an application specific integrated circuit (ASIC) and in another embodiment, the logic of the dequeue module is carried out by a multifunction processor.

Weighted fair dequeuing involves assigning weights to each class of traffic and then dequeuing packets from the respective class-specific queues 652A–652D according to the weights. In an embodiment, the weights may be assigned to the class-specific queues as a percentage of the total dequeuing capacity, where, for example, class A gets 40% of the dequeuing capacity, class B gets 20% of the dequeuing capacity, class C gets 20% of the dequeuing capacity, and class D gets 20% of the dequeuing capacity. With this example weight distribution, if 10,000 bytes of traffic are dequeued in a given time period and all of the class-specific queues have waiting packets, then approximately 4,000 bytes of dequeuing capacity are consumed by class A packets, 2,000 bytes of dequeuing capacity are consumed by class B packets, 2,000 bytes of dequeuing capacity are consumed by class C packets, and 2,000 bytes of dequeuing capacity are consumed by class D packets. This dequeuing algorithm ensures that each class of traffic is guaranteed to receive a designated portion of the available dequeuing capacity. In an embodiment, the order of dispatch from the class-specific queues is determined on a round-robin basis. To prevent dequeuing capacity from being wasted, the weights assigned to the class-specific queues should be equivalent to 100% of the total dequeuing capacity.

Strict priority dequeuing involves assigning priorities to the traffic classes relative to each other and then dequeuing packets from the respective class-specific queues 652A–652D only if there are no packets of a higher priority waiting in a higher priority class-specific queue. That is, packets are always dequeued in priority order from the highest priority class to the lowest priority class. For example, if the classes A through D are prioritized from highest to lowest as A, B, C, D, then packets from class-specific queue B can only be dequeued if class-specific queue A is empty and likewise, packets from class-specific queue D can only be dequeued if class-specific queues A, B, and C are empty. This dequeuing algorithm ensures that lower priority traffic never interferes with higher priority traffic.

Weighted fair with strict priority dequeuing involves prioritizing one class of traffic over the other classes and assigning weights to the other, non-prioritized, classes of traffic. Packets placed in the priority queue (i.e., the highest priority queue) are dequeued before packets in any of the other class-specific queues and the packets in the other class-specific queues are dequeued according to their weights as long as no packets are present in the priority queue. For example, if class A is given the highest priority and classes B, C, and D are weighted 60%, 20%, and 20% respectively, then class A traffic will always be dequeued before class B, C, and D traffic. Dequeuing capacity that is not consumed by class A traffic is distributed to the other class-specific queues according to their established weights. This dequeuing algorithm ensures that at least one class of traffic is guaranteed access to all of the available dequeuing capacity and that dequeuing capacity that is not consumed by the highest priority traffic is distributed according to the established weights. In an embodiment, delay sensitive traffic, such as voice traffic, can be placed in the priority class so that the delay sensitive traffic receives a guaranteed portion of the dispatch capacity. Although the example weighted fair with strict priority dequeuing algorithm involves giving priority to only one class of traffic, other variations of the algorithm may involve prioritizing more than one class of traffic over other classes of traffic. For example, the dequeuing capacity may be distributed to class A and B traffic on a strict priority basis with class C and D traffic sharing the remaining dequeuing capacity on an 80% to 20% basis.

Referring again to FIG. 6, the VC-specific SAR queue 656 within each per-VC queuing module 644 identifies packets that are awaiting dispatch to the ATM QoS/SAR module 646. In an embodiment, the SAR queue dispatches packets to the ATM QoS/SAR module on a first-in first-out basis in response to a dispatch signal 658 from the ATM QoS/SAR module. The size of each SAR queue can effect the latency of packets in a heavily loaded system. For example, a larger SAR queue can produce greater latency when using a weighted fair with strict priority dequeuing algorithm. In an embodiment, the size of the SAR queue can be adjusted to achieve the desired latency.

The ATM QoS/SAR module 646 performs two main functions. First, the ATM QoS/SAR module determines the order and rate at which variable-length packets are dispatched from the VC-specific SAR queues and second, the ATM QoS/SAR module segments the dispatched variable-length packets into multiple fixed-length ATM cells. Determining the order and rate at which variable-length packets are dispatched from the VC-specific SAR queues is controlled by an ATM QoS algorithm. The ATM QoS algorithm arbitrates among multiple VC-specific SAR queues to determine from which VC-specific SAR queue the next packet is dispatched. The ATM QoS algorithm is entirely separate from the enqueue and dequeue algorithms that are involved in supplying variable-length packets to the VC-specific SAR queues. The ATM QoS algorithm may include any known algorithm that is used to support ATM QoS requirements. For example, the ATM QoS algorithm may support constant bit rate service, variable bit rate service, available bit rate service, and unspecified bit rate service on a per-VC basis as defined by the International Telecommunications Union— Telecommunication Standardization Sector (ITU-T). The specific ATM QoS algorithm that is used to dispatch packets from the VC-specific SAR queues is implementation specific.

The segmenting of variable-length packets into fixed-length cells is well known in the field of packet-based networking. In an embodiment, the ATM QoS/SAR module segments outgoing variable-length packets into fifty-three byte ATM cells. At the input ATM interface, the ATM QoS/SAR module re-assembles variable-length packets from the respective incoming fifty-three byte ATM cells that are received on an ATM link.

After a packet has been dispatched from a SAR queue 656 and segmented into fixed-length cells by the ATM QoS/SAR module 646, the fixed-length cells are transmitted out onto an ATM link 638 by the PHY 648. The PHY is a well known functional unit and is not described further.

Although classifying packets and enqueuing/dequeuing packets as a function of packet class on a per-VC basis allows the division of bandwidth capacity by packet class to be controlled on a per-VC basis, the technique does not control the achievable transmission rate of each VC. The achievable transmission rate of each VC is controlled by the ATM QoS/SAR module and is a function of the speed of the ATM link and the volume of other traffic on the link.

In an embodiment, both the enqueue and dequeue modules 650 and 654 are embodied in hardware such as an ASIC. In an embodiment of a hardware-based dequeue module that implements a weighted fair dequeuing algorithm, a counter is maintained for each class-specific queue 652A–652D. The counter for each class-specific queue is initially set to zero and is then incremented by an equivalent value each time a packet is dispatched from the respective class-specific queue to the respective VC-specific SAR queue. Packets can be dispatched from a class-specific queue as long as the counter for the queue does not exceed a pre-established threshold. On a per-VC basis, the counters for all of the class-specific queues are set to zero whenever all of the class-specific queues are empty or whenever all of the counter values have exceeded their pre-established thresholds. Establishing threshold counter values is described in more detail below.

In an embodiment, threshold counter values are generated for each class-specific queue in response to user inputs. Specifically, weights are input for each class of traffic and the weights are converted into counter values, where the counter values represents an amount of data, such as a number of bytes. In an embodiment, counter values are generated on a per-VC basis for each class-specific queue by identifying the smallest weight value of all of the weights, and then assigning a base counter value, such as 1,500 bytes, to the class-specific queue with the smallest weight. Base counter values for the other class-specific queues are determined from the ratio of the respective weights to the minimum weight. The base counter value of each class-specific queue is then multiplied by a relative latency value to obtain a working counter value. The working counter value for a class-specific queue is the counter value that is used to limit the dispatch of packets from the particular queue. Example counter value calculations are shown in Table 1. In the example of Table 1, the relative latency is set to a default value of three, although this value is implementation specific.

TABLE 1

| Class | Weight | Base Counter Value (bytes) | Relative Latency (default = 3) | Working Counter Value (bytes) |
|---|---|---|---|---|
| Class A | 10 | 1,500 | 3 | 4,500 |
| Class B | 40 | 6,000 | 3 | 18,000 |
| Class C | 30 | 4,500 | 3 | 13,500 |
| Class D | 20 | 3,000 | 3 | 9,000 |

When using weighted fair dequeuing, weights are established for each class-specific queue 652A–652D and when using weighted fair queuing with strict priority, weights are established for the non-prioritized queues. Tables 2 and 3 depict two different examples of counter value calculations for a dequeuing algorithm that implements weighted fair with strict priority dequeuing. In the examples of Tables 2 and 3, class A is given priority over classes B, C, and D and classes B, C, and D are weighted as shown in the weight column. In an embodiment, the maximum working counter value for any buffer is limited by hardware resources. For example, each class-specific buffer is limited to 50 K bytes. Because the maximum buffer size related to each class-specific queue is limited by hardware resources, the maximum possible relative latency varies with the weight distributions and is limited to the lowest of the maximum relative latency calculations for each class-specific queue. For example, when the weight distributions are relatively even, as in the example of Table 2, the maximum possible relative latency is high. When the weight distributions are relatively uneven as in the example of Table 3, the maximum possible relative latency is low. Note that in both examples, the classes with lower weights could have higher relative latency values without exceeding the limitations of the hardware resources. However, to achieve the desired weights, the same relative latency must be used for each class.

TABLE 2

| Class | Weight | Base Counter Value (bytes) | Maximum Buffer Size (bytes) | Maximum Relative Latency | Working Counter Value (bytes) |
|---|---|---|---|---|---|
| Class B | 40 | 2,000 | 50,000 | 25 | 50,000 |
| Class C | 30 | 1,500 | 50,000 | 33 [but must use minimum value, 25] | 37,500 |
| Class D | 30 | 1,500 | 50,000 | 33 [but must use minimum value, 25] | 37,500 |

TABLE 3

| Class | Weight | Base Counter Value (bytes) | Maximum Buffer Size (bytes) | Maximum Relative Latency | Working Counter Value (bytes) |
|---|---|---|---|---|---|
| Class B | 80 | 12,000 | 50,000 | 4 | 48,000 |
| Class C | 10 | 1,500 | 50,000 | 33 [but must use minimum value, 4] | 6,000 |
| Class D | 10 | 1,500 | 50,000 | 33 [but must use minimum value, 4 | 6,000 |

In general, the accuracy of the achieved traffic distribution increases as the relative latency increases. This is because the number of packets dispatched from the class-specific queues will not translate into an exact match of the working counter values. That is, the actual number of bytes dispatched will not exactly match the threshold. Typically, an error of either excess bytes sent, or a shortage of bytes sent is left on the working counters. The magnitude of the error between the desired traffic distribution and the achieved traffic distribution decreases as the working counter value increases (which results from an increased relative latency). In an embodiment, an excess of up to 1,499 bytes is allowed to be dispatched from each class-specific queue. When the relative latency is low (i.e., 1), the error caused by an excess transmission of 1,499 bytes can be very significant. However, when the relative latency is high, the error caused by an excess transmission of 1,499 bytes is much less significant.

Increasing the relative latency increases the amount of time that a class-specific queue waits to dispatch a packet after the queue has exhausted the dispatch capacity that is dedicated to the queue. For example, if a class with a weight of 10% has used up its dispatch capacity before any packets are dispatched from the other class-specific queues, then that queue may have to wait for the other 90% of dispatch capacity to be consumed by the other class-specific queues before any more packets can be dispatched from the queue. Referring to the example of Table 1, in a worst case scenario, packets in the class A queue could have to wait for 40,500 bytes (18,000 bytes+13,500 bytes+9,000 bytes) to be dispatched between each dispatch of its allocated 4,500 bytes. The actual time periods that the delay translates into is a function of the transmission rate of the VC on which the traffic is sent. Example latency times may range from 10–200 milliseconds. That is, the delay is reduced as the transmission rate for the VC is increased.

In an embodiment in which a latency sensitive application has a low percentage of a slow link, the weighted fair with strict priority dequeue algorithm can be used to manage the delay of packets from the particular application. Specifically, the delay of packets from the application can be controlled by classifying the packets from the latency sensitive application in the highest priority class. In another embodiment, the latency can be controlled by setting the relative latency to a low value (i.e., 1). In an embodiment, decreasing the relative latency can have the effect of decreasing worst case latency of a bursty flow, decreasing the buffer requirements for a VC, and decreasing the accuracy of the traffic loads with regard to the assigned weights.

Because of hardware limitations, buffer space for the class-specific queues may be limited. To guarantee that buffer space is always available for incoming packets, the sum of the allocated buffers for all of the VCs should be set such that they do not exceed the total number of buffers that are available. In an embodiment, statistical averaging may be used to oversubscribe the available buffers with minimal risk of dropping packets.

Figure 7:
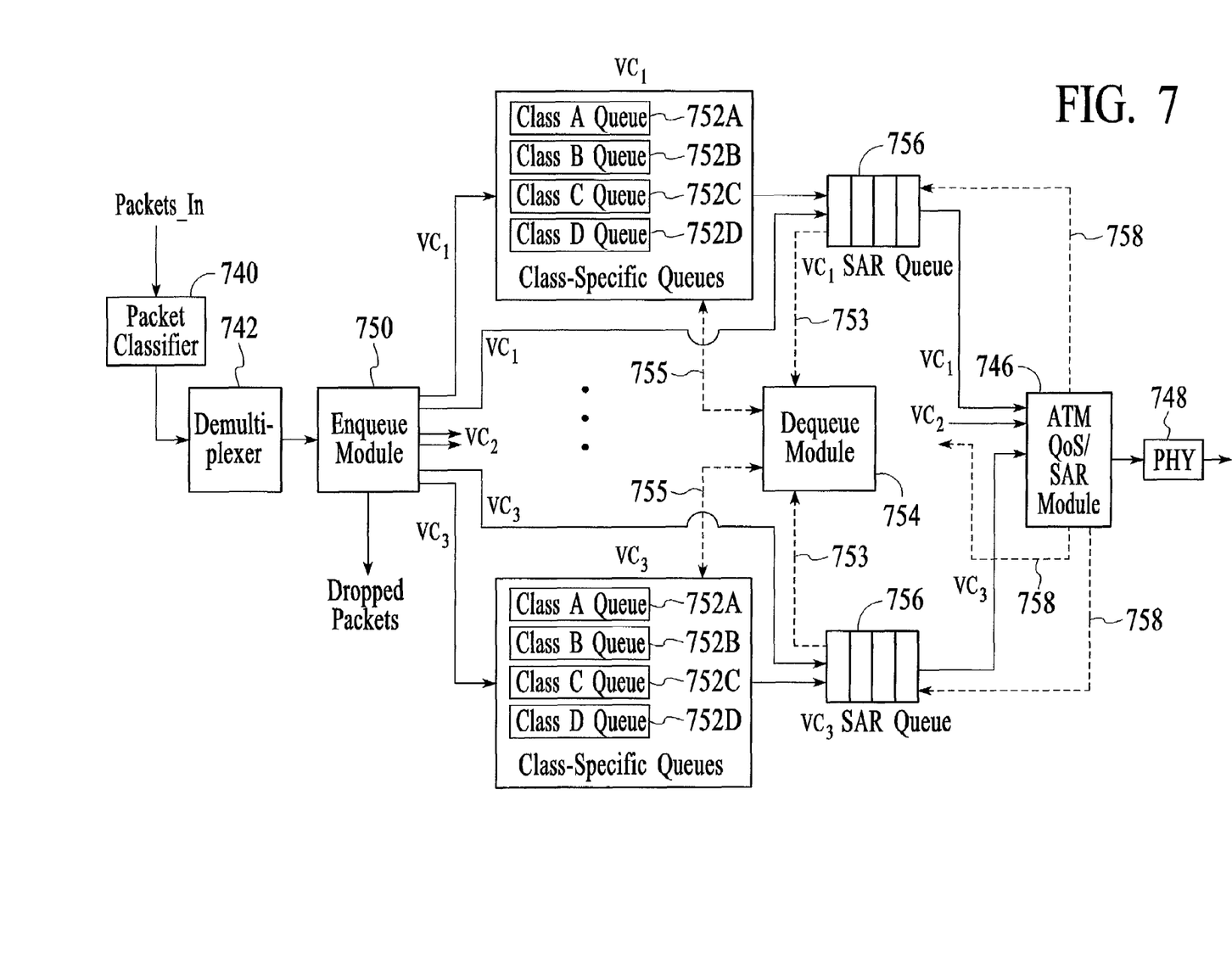
FIG. 7 depicts the functional units of a hardware embodiment of the logic carried out with the Ethernet switch/router of FIG. 3 in which a single enqueue module and a single dequeue module handle the enqueuing and dequeuing of variable-length packets for multiple different VCs in accordance with an embodiment of the invention.

Although for description purposes, FIG. 6 depicts logically distinct per-VC queuing modules 644, enqueue modules 650, and dequeue modules 654 for each VC, in a hardware embodiment, one physical enqueue module and one physical dequeue module may be implemented to handle the enqueuing and dequeuing of variable-length packets for multiple different VCs. FIG. 7 depicts the functional units of a hardware embodiment, similar to the embodiment of FIG. 6, in which a single enqueue module 750 and a single dequeue module 754 handle the enqueuing and dequeuing of variable-length packets for multiple different VCs. As depicted in FIG. 7, the enqueue module either queues a packet directly into a VC-specific SAR queue 756, queues the packet into a VC-specific and class-specific queue 752A, 752B, 752C, or 752D, or drops the packet. The VC-specific SAR queues provide queue_space_available signals 753 to the dequeue module. The queue_space available signals trigger the dequeue module to implement the specified dequeuing algorithm, on a per-VC basis, and to dispatch packets from the class-specific queues to the SAR queues according to the algorithm.

Although the embodiments of FIGS. 6 and 7 depict class-specific queues 652A–652D and 752A–752D and SAR queues 656 and 756 for each VC, in an embodiment, the class-specific and SAR queues only exist when there are packets in the respective queue. That is, a class A queue only exists if there are packets in the class A queue and the SAR queue only exists if there are packets in the SAR queue.

Figure 8:
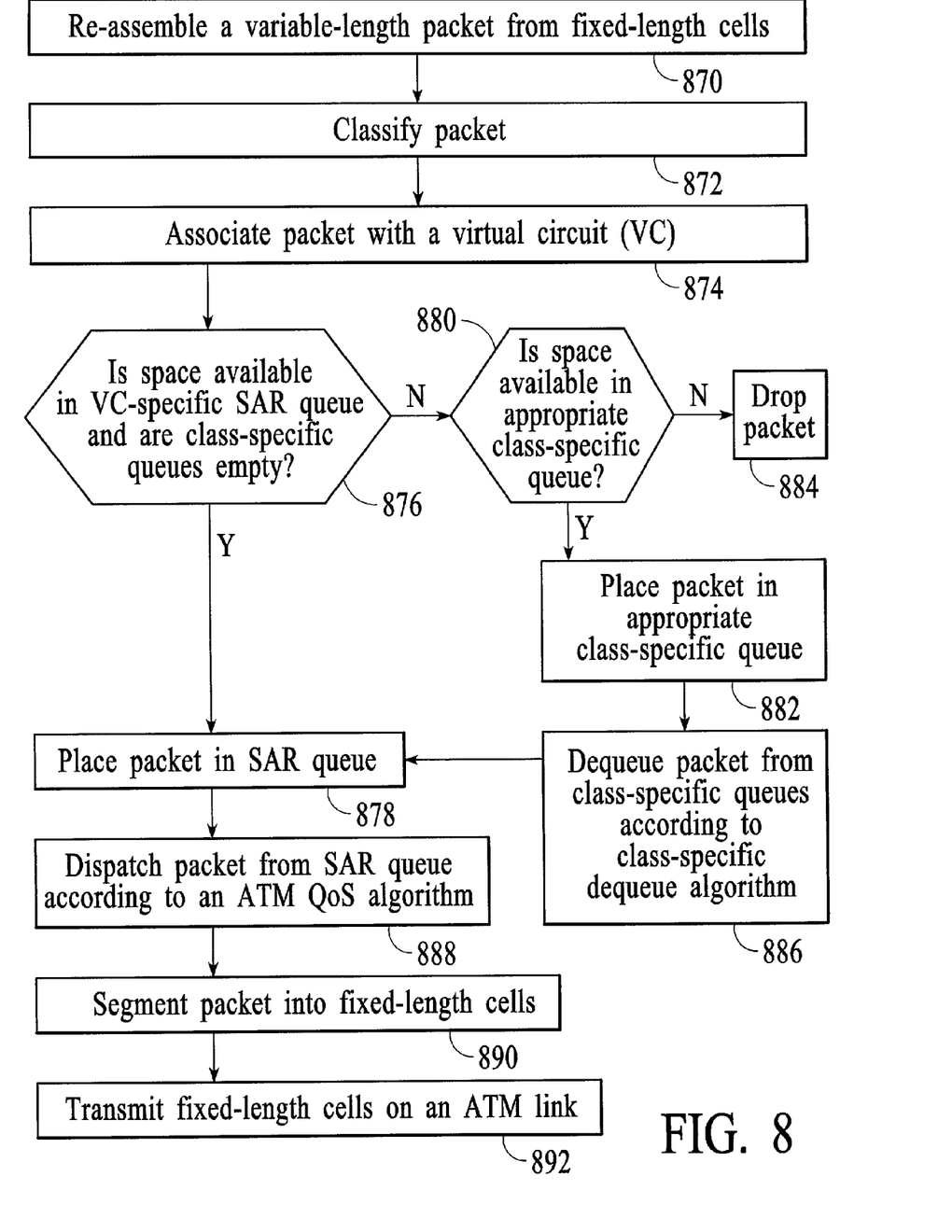
FIG. 8 depicts an example of a flow diagram for managing variable-length packets in accordance with an embodiment of the invention.

FIG. 8 depicts an example of a flow diagram for managing variable-length packets in accordance with an embodiment of the invention. In an embodiment, the steps depicted in the flow diagram are performed by the logic that is depicted in FIGS. 6 and 7. At step 870, a variable-length packet is re-assembled from fixed-length cells. At step 872, the re-assembled packet is classified and at step 874, the classified packet is associated with a VC. At decision point 876, if there is space available in the VC-specific SAR queue related to the packet and if all of the class-specific queues for the VC are empty, then the packet is placed into the SAR queue for the VC, step 878. If, however, there is no space available in the VC-specific SAR queue or if the class-specific queues for the VC are not empty, then an attempt is made to place the packet in the appropriate class-specific queue. At decision point 880, if there is space available in the appropriate class-specific queue, then at step 882, the packet is placed in the class-specific queue. If, however, there is not space available in the class-specific queue, then the packet is dropped, step 884. At step 886, packets in the class-specific queues are dequeued according to a class-specific dequeuing algorithm. A packet that is dequeued from one of the class-specific queues is placed into the SAR queue, step 878. At step 888, packets are dispatched from the SAR queue according to an ATM QoS algorithm. At step 890, a dispatched packet is segmented into fixed-length cells and at step 892, the fixed-length cells are transmitted on an ATM link.

In an embodiment, the rate at which the enqueue module, or modules, can discard packets is limited. If packets arrive at the enqueue module(s) faster than the packets can be enqueued, then other parts of the Ethernet switch/router begin to drop packets without regard to priority or VC. Since these other parts of the Ethernet switch/router drop packets without regard to priority or VC, the resultant achieved rates at the output ATM interface are likely to be different from what is expected. Because enqueuing decisions are made on a per-packet basis, if the traffic to an enqueue module(s) consists mainly of large packets, then the enqueue module(s) can keep up with a higher bit rate because fewer enqueuing decisions must be made per unit of time. In contrast, if the traffic to the enqueue module consists mainly of small packets, then the enqueue module may have a lower bit rate because more enqueuing decisions must be made per unit of time.

Figure 9:
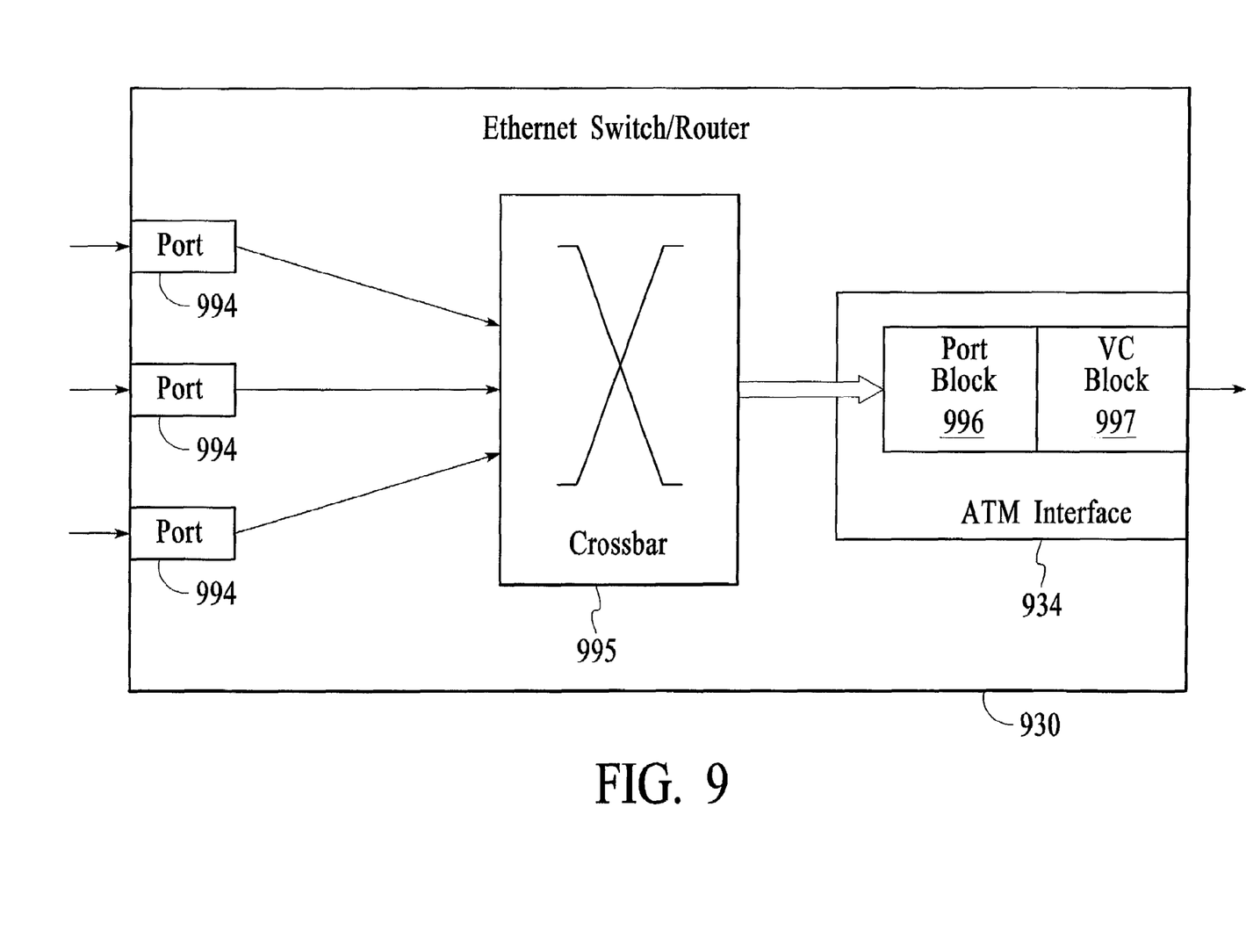
FIG. 9 depicts an example of an output ATM interface that includes a port block and a VC block for managing traffic flow within the Ethernet switch/router in accordance with an embodiment of the invention.

FIG. 9 depicts an example of an Ethernet switch/router 930 with three input ports 994 that feed an output ATM interface 934 through a switch fabric 995. The output ATM interface includes two different functional blocks, a port block 996 and a VC block 997, which are capable of handling excess traffic in different ways. The port block discards excess traffic in the form of variable-length packets without regard to the ATM VC for which the traffic is intended. The VC block, which includes the functionality described above with reference to FIGS. 6 and 7 discards excess traffic on a per-VC basis.

When the output ATM interface 934 is overloaded, the VC block 997 drops packets on a per-VC and per-class basis as described above. However, when the output ATM interface is severely overloaded and the enqueue module(s) of the VC block cannot keep up with the incoming packets, back-pressure is applied to the port block 996. In response to the back-pressure, the port block discards packets based on the discard algorithm for the port, not the enqueuing and dequeuing algorithms that are used for the class-specific queues. If, for example, the port block is set to discard packets based on strict priority, and there is enough class A and class B traffic to fill the output ATM link, then no class C or class D packets will arrive at the VC block. If weighted fair queuing is being used in the VC block, achieved rates will not match the expected rates because no class C or class D packets make it through the port block.

To achieve the best QoS results during severe overloading, there are several techniques that can be implemented. One technique involves setting the port discard algorithm to closely match the dequeuing algorithm of the VC block. This is particularly useful when most or all of the VCs use identical dequeuing algorithms. A second strategy is to prevent the overload condition by limiting the amount of traffic forwarded to the output ATM interface.

Although the system and method for managing traffic are described with reference to a DSL network, the system and method can be applied to other types of networks. Furthermore, the system and method may be applied to traffic that is received from other protocols that utilize virtual circuits, such as Frame Relay. In addition, although the switch/router is described as an Ethernet switch/router, the invention may be implemented on a switch/router that utilizes another variable-length packet protocol.

Although specific embodiments of the invention have been described and illustrated, the invention is not to be limited to the specific forms or arrangements of parts as described and illustrated herein. The invention is limited only by the claims.

What is claimed is:

1. A method for managing traffic in a packet-based switch/router that has an input interface for receiving traffic on multiple virtual circuits (VCs) and an output interface for transmitting traffic on multiple VCs, said method comprising:
    classifying packets into traffic classes;
    associating said packets with a VC;
    on a per-VC basis, enqueuing said packets into class-specific queues; and
    on a per-VC basis, dequeuing said packets from said class-specific queues enqueuing said packets that are dequeued from said class-specific queues into VC-specific segmentation and re-assembly (SAR) queues; and dequeuing said packets from said VC-specific SAR queues according to a dequeuing algorithm that arbitrates among multiple VC-specific SAR queues.

2. The method of claim 1 wherein dequeuing said packets from said class-specific queues includes dequeuing said packets from said class-specific queues as a function of traffic class.

3. The method of claim 2 wherein classifying said packets includes reading header information from said packets, said packets being variable-length packets.

4. The method of claim 2 wherein dequeuing said packets from said class-specific queues includes dequeuing said packets according to a weighted fair algorithm.

5. The method of claim 2 wherein dequeuing said packets from said class-specific queues includes dequeuing said packets according to a strict priority algorithm.

6. The method of claim 2 wherein dequeuing said packets from said class-specific queues includes dequeuing said packets according to a weighted fair with strict priority algorithm.

7. The method of claim 1 further including segmenting, into fixed-length cells, said packets that are dequeued from said VC-specific SAR queues.

8. The method of claim 7 further including transmitting said fixed-length cells from said output interface on a VC.

9. The method of claim 8 further including transmitting said fixed-length cells in the order that the respective packets are dequeued from said VC-specific SAR queues.

10. The method of claim 1 wherein said packets are variable-length packets.

11. The method of claim 10 wherein classifying said variable-length packets includes reading header information from said variable-length packets.

12. The method of claim 11 wherein classifying said variable-length packets includes reading layer 3 and layer 4 header information from said variable-length packets.

13. The method of claim 10 further including:
    enqueuing said dequeued variable-length packets into VC-specific SAR queues;
    dequeuing said variable-length packets from said VC-specific SAR queues according to a dequeuing algorithm that arbitrates among multiple VC-specific SAR queues;
    segmenting, into fixed-length cells, said variable-length packets that are dequeued from said VC-specific SAR queues; and transmitting said fixed-length cells from said output.

14. The method of claim 1 further including:
receiving said packets into said switch/router as fixed-length asynchronous transfer mode (ATM) cells;
re-assembling said packets from said fixed-length ATM cells;
enqueuing said dequeued packets into VC-specific SAR queues;
dequeuing said packets from said VC-specific SAR queues according to a dequeuing algorithm that arbitrates among multiple VC-specific SAR queues;
segmenting, into fixed-length cells, said packets that are dequeued from said VC-specific SAR queues; and
transmitting said fixed-length cells from said output.

15. The method of claim 14 further including transmitting packets from said switch/router on the same VC that said packets were received at said switch/router.

16. A method for managing traffic in a packet-based switch/router that has an input interface for receiving traffic on multiple virtual circuits (VCs) and an output interface for transmitting traffic on multiple VCs, said method comprising:
receiving fixed-length cells;
re-assembling variable-length packets from said fixed-length cells;
classifying said variable-length packets into traffic classes;
associating said variable-length packets with a VC;
on a per-VC basis, enqueuing said variable-length packets directly into a VC-specific segmentation and re-assembly (SAR) queue if there is queue space available in said VC-specific SAR queue; and
on a per-VC basis, enqueuing said variable-length packets into class-specific queues if there is not queue space available in the respective VC-specific SAR queue.

17. The method of claim 16 wherein said variable-length packets are enqueued directly into a VC-specific SAR queue if there is queue space available in said VC-specific SAR queue and if there are no packets in the respective class-specific queues.

18. The method of claim 16 further including, on a per-VC basis, dropping packets if there is no queue space available in said VC-specific SAR queue or in the respective class-specific queues.

19. The method of claim 16 wherein classifying variable-length packets includes classifying said variable-length packets based on information in the headers of said variable-length packets.

20. The method of claim 16 wherein classifying said variable-length packets includes reading layer 3 and layer 4 header information from said variable-length packets.

21. The method of claim 16 further including:
receiving said fixed-length cells as fixed-length ATM cells;
re-assembling said variable-length packets from said fixed-length ATM cells;
dequeuing variable-length packets from said VC-specific SAR queues according to a dequeuing algorithm that arbitrates among multiple VC-specific SAR queues;
segmenting, into fixed-length ATM cells, said variable-length packets that are dequeued from said VC-specific SAR queues; and
transmitting said fixed-length ATM cells from said output.

22. The method of claim 16 further including, on a per-VC basis, dequeuing packets from said class-specific queues to the respective VC-specific SAR queues as a function of traffic class when there is queue space available in the respective VC-specific SAR queues.

23. The method of claim 22 wherein dequeuing said packets from said class-specific queues includes dequeuing said packets according to a weighted fair algorithm.

24. The method of claim 22 wherein dequeuing said packets from said class-specific queues includes dequeuing said packets according to a strict priority algorithm.

25. The method of claim 22 wherein dequeuing said packets from said class-specific queues includes dequeuing said packets according to a weighted fair with strict priority algorithm.

26. A packet-based switch/router comprising:
an input interface for receiving traffic on multiple virtual circuits (VCs);
an output interface for transmitting traffic on multiple VCs;
a packet classifier for classifying packets into traffic classes based on packet header information;
a demultiplexer for associating packets with a VC;
VC-specific and class-specific queues;
VC-specific segmentation and re-assembly (SAR) queues;
an enqueue module for enqueuing packets by traffic class into said VC-specific and class-specific queues;
a dequeue module for dequeuing packets from said VC-specific and class-specific queues to said VC-specific SAR queues a quality of service (QoS)/SAR module for dequeuing packets from said VC-specific SAR queues.

27. The packet-based switch/router of claim 26 wherein said QoS/SAR module segments dequeued variable-length packets into fixed-length cells for transmission on a VC.

28. The packet-based switch/router of claim 26 wherein said QoS/SAR module arbitrates among multiple VC-specific SAR queues.

29. The packet-based switch/router of claim 26 wherein said dequeue module dequeues packets from said VC-specific and class-specific queues as a function of traffic class.

30. The packet-based switch/router of claim 29 wherein said dequeue module dequeues packets from said VC-specific and class-specific queues according to a weighted fair algorithm.

31. The packet-based switch/router of claim 29 wherein said dequeue module dequeues packets from said VC-specific and class-specific queues according to a strict priority algorithm.

32. The packet-based switch/router of claim 29 wherein said dequeue module dequeues packets from said VC-specific and class-specific queues according to a weighted fair with strict priority algorithm.

33. The packet-based switch/router of claim 26 wherein said packet classifier reads header information from said packets to classify said packets.

34. The packet-based switch/router of claim 26 wherein said packet classifier reads layer 3 and layer 4 header information from said packets to classify said packets.

35. A packet-based switch/router comprising:
an input interface for receiving traffic on multiple virtual circuits (VCs);
an output interface for transmitting traffic on multiple VCs;
a packet classifier for classifying received packets into traffic classes based on packet header information;
a demultiplexer for associating packets with a VC;

means for enqueuing packets into VC-specific and class-specific queues;

means for dequeuing packets from said VC-specific and class-specific queues into VC-specific segmentation and re-assembly (SAR) queues means for dequeuing packets from said VC-specific SAR queues for segmentation into fixed-length cells.

36. The packet-based switch/router of claim 35 wherein said means for dequeuing includes means for dequeuing packets from said VC-specific and class-specific queues as a function of traffic class.

37. The packet-based switch/router of claim 36 wherein said means for dequeuing includes means for dequeuing packets from said VC-specific and class-specific queues according to a weighted fair algorithm.

38. The packet-based switch/router of claim 36 wherein said means for dequeuing includes means for dequeuing packets from said VC-specific and class-specific queues according to a strict priority algorithm.

39. The packet-based switch/router of claim 36 wherein said means for dequeuing includes means for dequeuing packets from said VC-specific and class-specific queues according to a weighted fair with strict priority algorithm.

40. The packet-based switch/router of claim 35 wherein said packet classifier reads header information from said packets to classify said packets.

41. The packet-based switch/router of claim 35 wherein said packet classifier reads layer 3 and layer 4 header information from said packets to classify said packets.

42. The packet-based switch/router of claim 35 wherein said means for enqueuing includes an enqueue module for enqueuing packets from multiple VCs and wherein said means for dequeuing includes a dequeue module for dequeuing packets from multiple VCs.

43. The packet-based switch/router of claim 35 wherein said means for enqueuing includes a VC-specific enqueue module for each VC and wherein said means for dequeuing includes a VC-specific dequeue module for each VC.

44. A packet-based switch/router comprising:
an input interface for receiving traffic on multiple virtual circuits (VCs);
an output interface for transmitting traffic on multiple VCs;
a packet classifier for classifying packets into traffic classes based on packet header information;
a demultiplexer for associating packets with a VC;
means for enqueuing said packets directly into VC-specific segmentation and re-assembly (SAR) queues if there is queue space available in said VC-specific SAR queues and if there are no packets in class-specific queues of the respective VCs or into said class-specific queues of the respective VCs if there is no queue space available in said VC-specific SAR queues means for dequeuing packet from said VC-specific SAR queues for segmentation into fixed-length cells.

45. The packet-based switch/router of claim 44 wherein said means for enqueuing further includes means for dropping packets if there is no queue space available in said VC-specific SAR queues or in said class-specific queues of the respective VCs.

46. The packet-based switch/router of claim 44 further including means for dequeuing packets from said class-specific queues to said VC-specific SAR queues as a function of traffic class when there is queue space available in said VC-specific SAR queues.

47. The packet-based switch/router of claim 46 wherein said means for enqueuing includes an enqueue module for enqueuing packets from multiple VCs and wherein said means for dequeuing includes a dequeue module for dequeuing packets from multiple VCs.

48. The packet-based switch/router of claim 46 wherein said means for enqueuing includes a VC-specific enqueue module for each VC and wherein said means for dequeuing includes a VC-specific dequeue module for each VC.

49. The packet-based switch/router of claim 46 wherein said means for dequeuing includes means for dequeuing packets from said class-specific queues according to a weighted fair algorithm.

50. The packet-based switch/router of claim 46 wherein said means for dequeuing includes means for dequeuing packets from said class-specific queues according to a strict priority algorithm.

51. The packet-based switch/router of claim 46 wherein said means for dequeuing includes means for dequeuing packets from said class-specific queues according to a weighted fair with strict priority algorithm.

52. The packet-based switch/router of claim 44 wherein said means for dequeuing packets from said VC-specific SAR queues includes means for arbitrating among multiple VC-specific SAR queues.

53. The packet-based switch/router of claim 44 wherein said packet classifier reads header information from said packets to classify said packets.

54. The packet-based switch/router of claim 44 wherein said packet classifier reads layer 3 and layer 4 header information from said packets to classify said packets.

* * * * *